United States Patent
Harding et al.

(10) Patent No.: US 7,607,375 B2
(45) Date of Patent: Oct. 27, 2009

(54) APPARATUS AND METHOD FOR ATTACHING SPOUTS TO CONTAINERS

(75) Inventors: Jeffrey Harding, Sylvania, OH (US); Wesley S. Hawk, York, PA (US)

(73) Assignee: Graham Packaging Company, L.P., York, PA (US)

( * ) Notice: Subject to any disclaimer, the term of this patent is extended or adjusted under 35 U.S.C. 154(b) by 304 days.

(21) Appl. No.: 11/771,049

(22) Filed: Jun. 29, 2007

(65) Prior Publication Data

US 2009/0000435 A1    Jan. 1, 2009

(51) Int. Cl.
*B23B 1/00*    (2006.01)
*B23B 5/14*    (2006.01)

(52) U.S. Cl. ............................................. 82/47; 82/53
(58) Field of Classification Search ................ 83/411.7, 83/914, 923; 82/46, 47, 53, 70.2, 83, 101; 156/69, 309.9; 425/289, 316, 806
See application file for complete search history.

(56) References Cited

U.S. PATENT DOCUMENTS

| | | | | |
|---|---|---|---|---|
| 4,876,930 A | * | 10/1989 | Thatcher | 82/46 |
| 5,257,560 A | * | 11/1993 | Palazzolo | 82/46 |
| 5,564,319 A | * | 10/1996 | Kowal | 82/46 |
| 5,617,768 A | * | 4/1997 | Palazzolo | 82/47 |
| 5,840,349 A | | 11/1998 | Brown, Jr. et al. | 425/532 |
| 5,855,299 A | | 1/1999 | Arnold et al. | 222/109 |
| 6,321,813 B1 | | 11/2001 | Miyajima et al. | |
| 6,619,946 B1 | | 9/2003 | Marshall et al. | |
| 6,722,102 B1 | | 4/2004 | Pape et al. | |
| 6,763,752 B2 | * | 7/2004 | Marshall et al. | 83/499 |
| 6,886,437 B2 | * | 5/2005 | Waldstadt | 82/70.2 |
| 6,952,988 B2 | | 10/2005 | Darr | |
| 2004/0050220 A1 | | 3/2004 | Proffitt et al. | 82/47 |

FOREIGN PATENT DOCUMENTS

WO    93/02923    2/1993

* cited by examiner

*Primary Examiner*—Willmon Fridie
(74) *Attorney, Agent, or Firm*—Stradley Ronon Stevens & Young, LLP

(57) ABSTRACT

A method and apparatus for cutting moils from necks of molded plastic containers and installing spouts in the necks are disclosed. The apparatus includes a pick and place mechanism that rotates along an arcuate path transporting the containers between a cutting station, a facing station and an assembly station positioned along the path. An oven located above the assembly station heats spouts which are coated with a hot-melt adhesive. The heated spouts are supplied to the assembly station under gravity feed. The method includes cutting the moils from the container necks at the cutting station, finishing the neck by burnishing and reaming at the facing station, heating the spouts in the oven, orienting the spouts and inserting them into the finished necks of the containers at the assembly station.

22 Claims, 7 Drawing Sheets

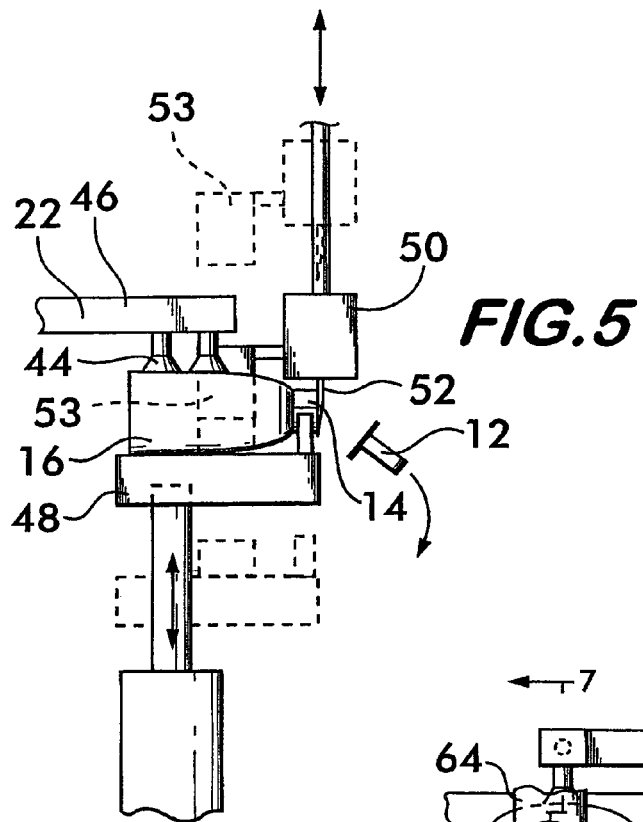
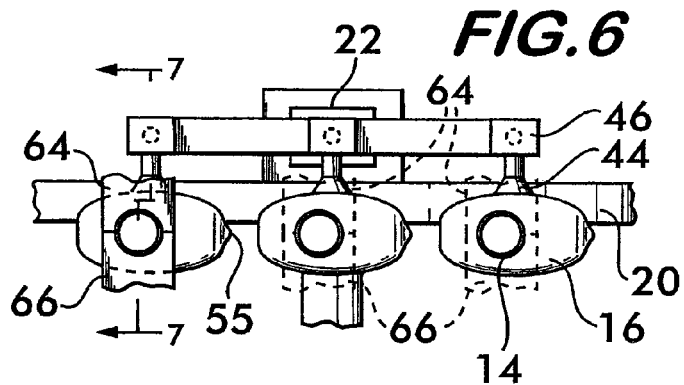
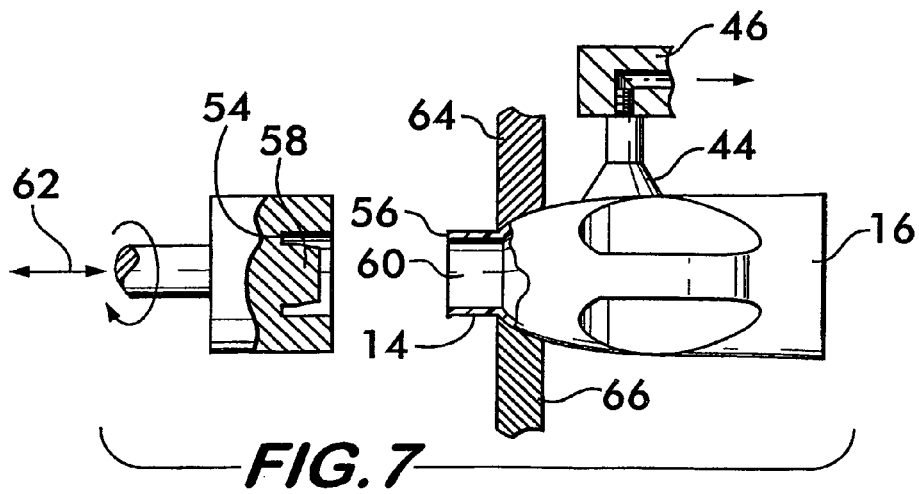

APPARATUS AND METHOD FOR ATTACHING SPOUTS TO CONTAINERS

FIELD OF THE INVENTION

This invention relates to an apparatus and a method for the manufacture of containers having pour spouts.

BACKGROUND OF THE INVENTION

Containers holding liquids such as laundry detergents and fabric softeners as well as other fluids are economically manufactured in a continuous blow molding process wherein a parison comprising a hollow tube of molten polymer is extruded continuously from a flow head. The parison is acted on by a series of moving molds, each of which is formed of mold halves which sequentially engage a respective portion of the parison by closing about the parison from opposite sides. As the mold halves comprising a particular mold close about a parison portion, knives on the mold halves sever the parison portion from the continuously extruding parison. The mold then moves away from the parison to allow the next mold to engage its respective parison portion. After a parison portion is engaged by a mold and cut from the parison, air is injected into the parison portion forcing it to expand and assume the shape of the mold. The mold is then opened to release the newly molded container to a conveyor, which transports the container for further processing. The mold then travels back to the parison to mold the next container. A detailed description of a process and apparatus for producing the containers is provided in U.S. Pat. No. 5,840,349, hereby incorporated by reference herein.

Containers made according to the aforementioned process may have a dome or moil attached to what will become the neck of the container once the moil is removed. Removal of the moil is effected by cutting it off to expose the opening to the interior of the container, the opening being defined by the neck. Additional finishing steps, such as burnishing of the neck surface created by removal of the moil or reaming of the neck, may also be effected.

For containers holding liquids such as laundry detergents which must be repeatedly poured in measured amounts, it is advantageous to install in the neck of the container a plastic non-drip spout which permits controlled pouring and drains any liquid remaining on the spout after pouring back into the container. Such spouts are described in U.S. Pat. No. 5,855,299, hereby incorporated by reference herein.

It is advantageous to attach the spout to the container neck using a hot-melt adhesive which provides a secure attachment and a fluid-tight seal between the spout and the neck. Attachment of the spout requires separate process steps and equipment, which enlarges the factory floor space required for producing a finished container. It would be advantageous to provide an apparatus and a method which can produce a container by performing the necessary neck trimming and finishing functions as well as attachment of the spout but which requires a minimum of floor space.

SUMMARY OF THE INVENTION

The invention concerns an apparatus for removing a moil from a neck of a container and attaching a spout thereto. The apparatus comprises a cutting station having a blade engageable with the neck for cutting the moil. Either the blade or the container is movable relatively to the other to effect the cutting.

The apparatus also includes an assembly station having a movable arm engageable with the spout, the arm being movable to insert the spout into the neck. The arm may be mounted on a carriage movable along a horizontal axis for inserting the spout into the neck. The assembly station may also include an alignment chute. The alignment chute is vertically oriented. An alignment wheel is mounted adjacent to the alignment chute and is engageable with the spout. The alignment wheel turns the spout about an axis so as to align the spout with the container. The alignment chute and the spout are dimensioned so that the spout drops through the alignment chute when the spout is oriented with the container. The arm then pushes the spout from the alignment chute into the neck.

The apparatus may also include a facing station having finishing tools such as a burnishing tool and/or a reaming tool engageable with the neck for smoothing a surface created upon cutting of the moil as well as reaming the neck to a desired diameter. Either the finishing tool or the container is movable relatively to the other to effect the finishing tasks.

A pick and place device holds the container and is movable to position the container in sequence at the cutting station, the facing station and the assembly station. Preferably, the pick and place device comprises an armature rotatable about an axis. The stations are arranged along an arcuate path about the armature. The armature moves the containers along the arcuate path between the stations.

An oven heats the spout before it is attached to the container neck. The oven is positioned above one of the stations. The spout is coated with a hot melt adhesive which is used to attach it to the container. The oven has an entrance for receiving the spout and an exit positioned to discharge the spout to the assembly station. In one embodiment, the oven comprises a guide chute positioned above the assembly station. The guide chute is oriented at an angle relatively to a vertical axis so that the spouts move through the guide chute under gravity. Preferably, the oven comprises a convection oven circulating hot air over the spout.

The invention also encompasses a method of removing a moil from a neck of a container and attaching a spout thereto. The spout has hot melt adhesive thereon to effect attachment to the container. The method comprises:

(a) moving the container to a cutting station;
(b) cutting the moil from the neck of the container at the cutting station;
(c) moving the container to an assembly station;
(d) heating the spout until the hot melt adhesive is molten;
(e) aligning the spout with the neck; and
(f) inserting the spout into the neck.

The method may also comprise moving the container to a facing station and finishing a surface on the neck created when the moil is cut therefrom. The finishing may comprise burnishing and/or reaming at the facing station. Preferably, the container is moved between the stations along an arcuate path.

Heating of the spout comprises moving the spout through an oven. Preferably, the spout is moved through the oven by gravity and the heating is effected by moving hot air through the oven. For some containers, the method includes rotationally orienting the spout relatively to the container before inserting the spout into the neck.

BRIEF DESCRIPTION OF THE DRAWINGS

FIG. 5 is a side view of a portion of the apparatus taken at line 5-5 of FIG. 4;

FIG. 6 is a partial sectional view taken at line 6-6 of FIG. 1;

FIG. 7 is a partial sectional view taken at line 7-7 of FIG. 6;

DETAILED DESCRIPTION OF THE EMBODIMENTS

Figure 1:
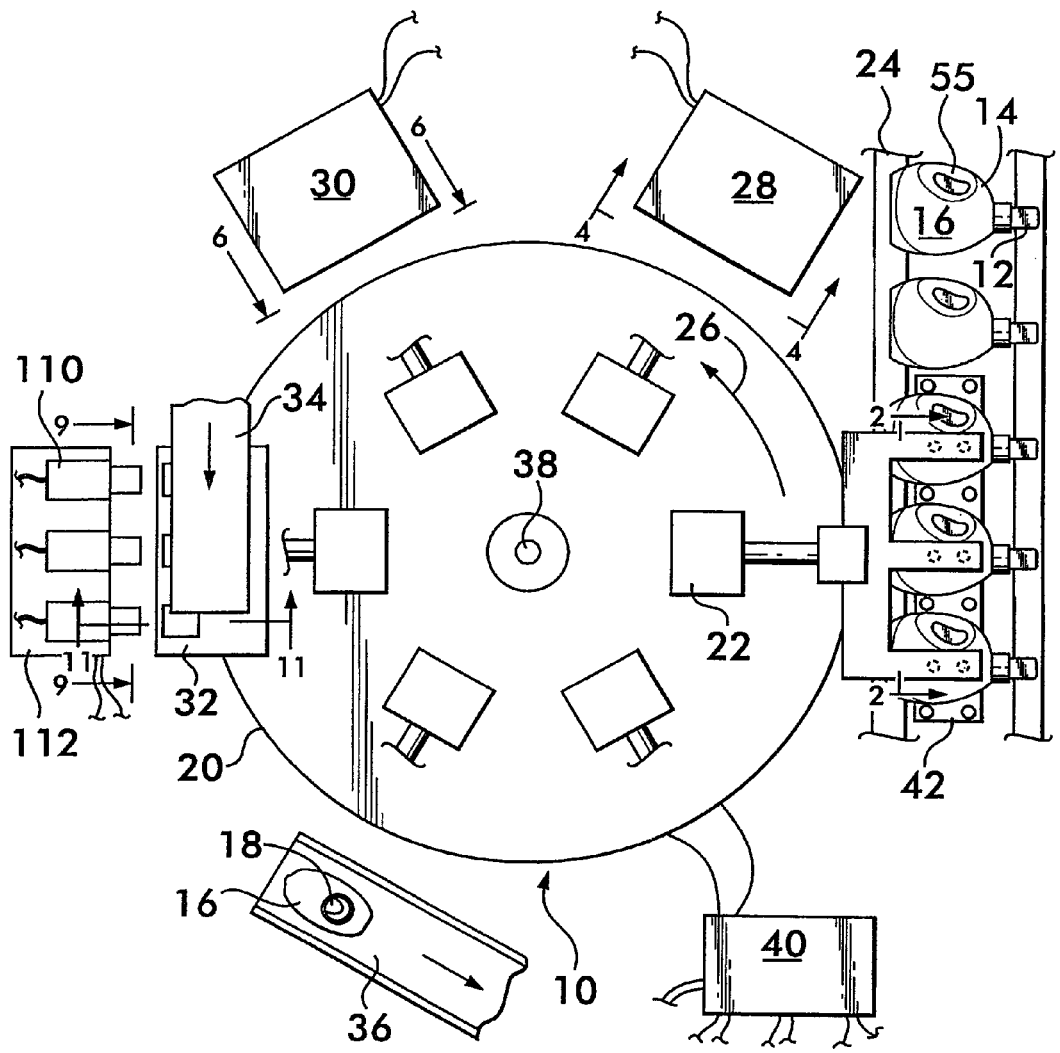
FIG. 1 shows a plan view of the apparatus according to the invention.

FIG. 1 shows an apparatus 10 for removing a moil 12 from the neck 14 of a molded plastic container 16 and attaching a spout 18 to the neck. Apparatus 10 comprises a rotating armature 20 on which are mounted a plurality of pick and place mechanisms 22. The pick and place mechanisms receive containers 16 from a supply conveyor 24 and move them along an arcuate path 26 upon rotation of the armature 20. In this example, the armature rotates counter-clockwise and moves the pick and place mechanisms along path 26 to a cutting station 28, a finishing station 30 and an assembly station 32. An oven 34 is positioned above the assembly station 32 and supplies heated spouts 18 to the station for assembly onto the necks 14 of the containers. A take-away conveyor 36 receives the containers from the pick and place mechanisms after they leave the assembly station 32 and transports them away for further processing or packaging. Each of the components is described in detail below.

Armature 20 rotates about an axis 38, moving the pick and place mechanisms along the arcuate path 26. Preferably, the armature is rotated by an electric motor. Rotation of the armature is controlled by a controller 40, which may be, for example, a microprocessor with resident software, or a programmable logic controller, which controls and coordinates the operation of all of the apparatus components. The armature 20 rotates counter-clockwise and positions the pick and place mechanisms 22 at each aforementioned station in turn, allowing the containers 16 to dwell at each station long enough so that a particular operation may be performed on them.

Figure 2:
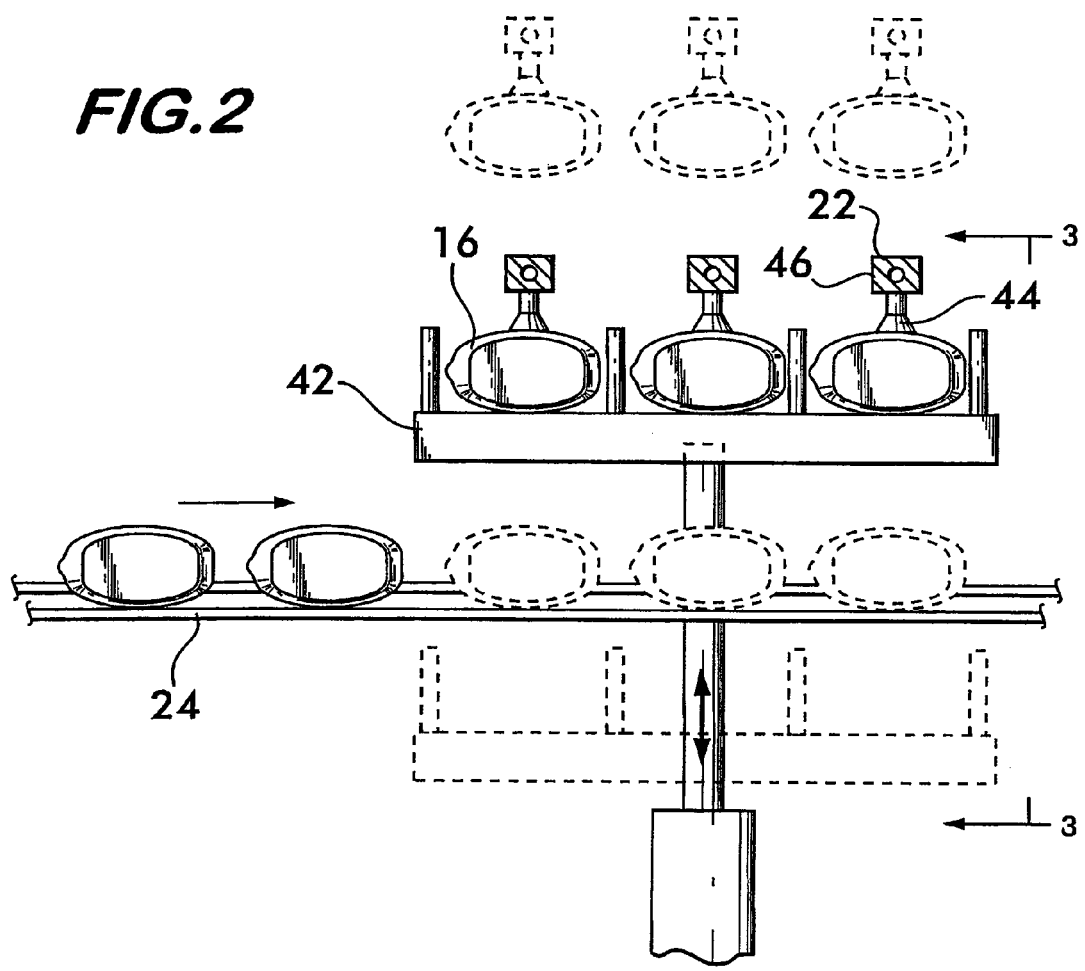
FIG. 2 is a partial sectional view taken at line 2-2 of FIG. 1.
Figure 3:
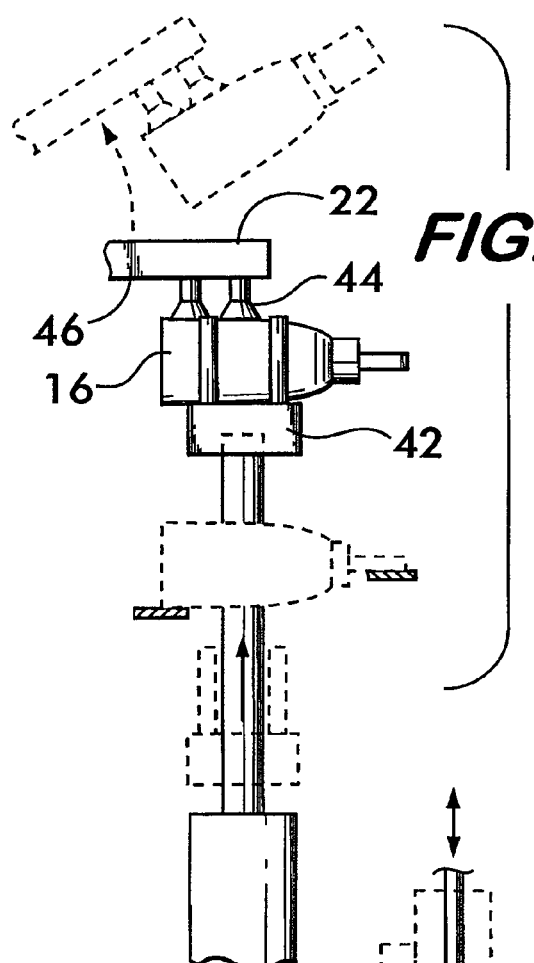
FIG. 3 is a side view of a portion of the apparatus taken at line 3-3 of FIG. 2.

As best shown by a comparison of FIG. 1-3, molded plastic containers 16 are received from the supply conveyor 24 and deposited three at a time onto an elevator 42 located at the end of the supply conveyor. Elevator 42 lifts the containers upwardly as illustrated in broken and solid lines in FIGS. 2 and 3 where they can be conveniently received by one of the pick and place mechanisms 22 mounted on the armature. In this example, each pick and place mechanism has pneumatically actuated suction cups 44 mounted on a pivoting arm 46. Negative pressure is drawn within the cups by a pneumatic actuator such as a pump (not shown) and the suction cups grasp the containers 16. The arm pivots upwardly, as shown in broken line in FIG. 3, to remove the containers from the elevator 42. The elevator drops back down to receive the next load of containers from the conveyor and the armature rotates to bring another pick and place mechanism into alignment with the next load of containers to repeat the process. In this example, the apparatus processes three containers simultaneously, it being understood that more or fewer containers could also be processed at one time.

Figure 4:
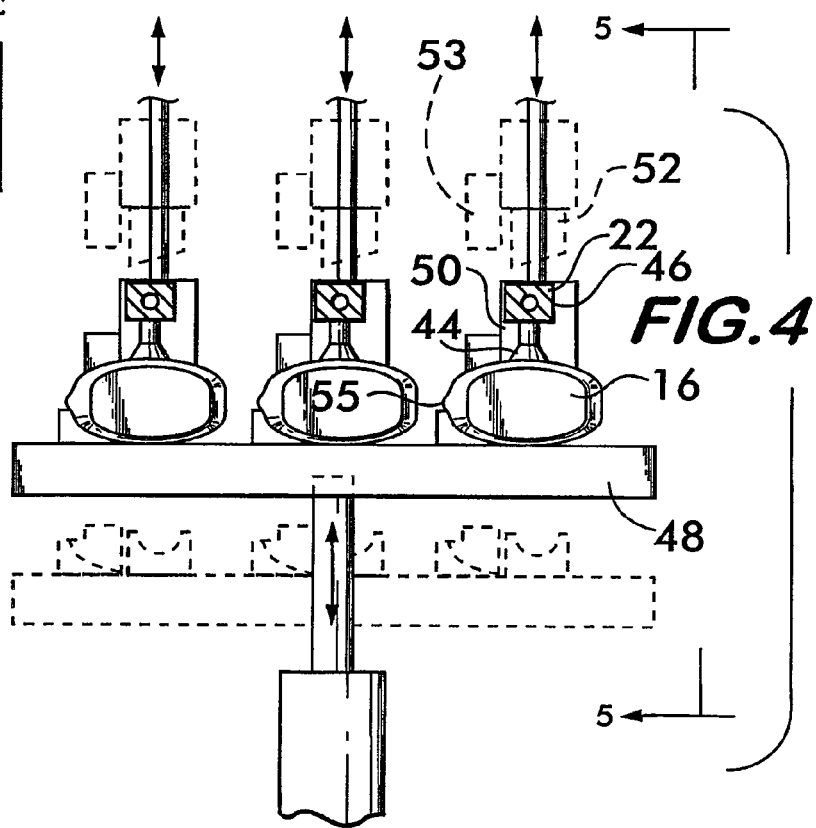
FIG. 4 is a partial sectional view taken at line 4-4 of FIG. 1.

Armature 20 rotates pick and place mechanism 22 holding containers 16 to position the containers at the cutting station 28, shown in detail in FIGS. 4 and 5. A movable anvil 48 is raised to support the containers and a cutting frame 50 moves down from above. Cutting frame 50 has blades 52 which align with the containers to cut the moils 12 from the necks 14 (see FIG. 5). Additional blades 53 may also be mounted on the frame 50. The blades 53 are shaped and aligned to cut out the flash within the handle 55 of the container 16 if a handle is present. The anvil and cutting frame may be actuated pneumatically but other actuators, such as hydraulic actuators, electrical, mechanical or electro-mechanical actuators, are also feasible. The anvil 48 and the cutting frame are then withdrawn from the containers allowing the armature to rotate the pick and place mechanism to align the containers 16 with the facing station 30 as shown in FIGS. 1 and 6.

Figure 8:
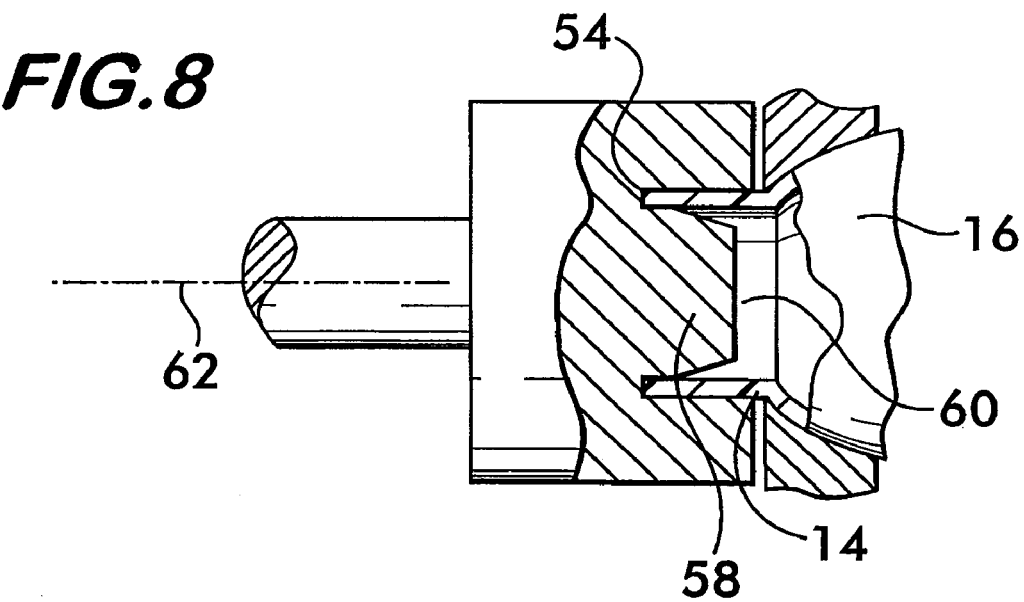
FIG. 8 is a detailed view of a portion of FIG. 7 on an enlarged scale.

Facing station 30 includes finishing tools (see FIGS. 7 and 8) such as a burnishing tool 54 for smoothing the top surface 56 of neck 14, which may be rough or uneven from the cutting process. A reamer 58 may also be provided to cut the inside surface 60 of neck 14 and establish a desired inner diameter. As best shown in FIGS. 7 and 8, finishing tools 54, 58 rotate about an axis of rotation 62 and are moved horizontally into engagement with the necks 14 of containers 16 once the containers are aligned with the tools upon rotation of the armature. The finishing tools are preferably rotated by one or more electric motors (not shown) and operate to engage the containers in the manner of a drill press oriented horizontally. Actuation of the horizontal motion may be by one of various means including pneumatic, hydraulic or mechanical actuators controlled by the controller (not shown). Vertically movable clamping jaws 64, 66 support the containers as the tools are brought into engagement with the necks 14. When the finishing operations are completed, the finishing tools are retracted out of engagement and the clamping jaws are withdrawn, allowing the armature to rotate further and position the containers at the assembly station 32.

As shown in FIG. 1, the oven 34 is positioned above the assembly station 32. Spouts 18 are supplied to the apparatus 10 with a coating of hot-melt adhesive on surfaces which will interface with the container necks 14 upon assembly, the adhesive ensuring a secure, fluid-tight attachment between the spout and the container. The oven functions to heat the adhesive so that it is molten and adheres to the neck upon assembly.

Figure 10:
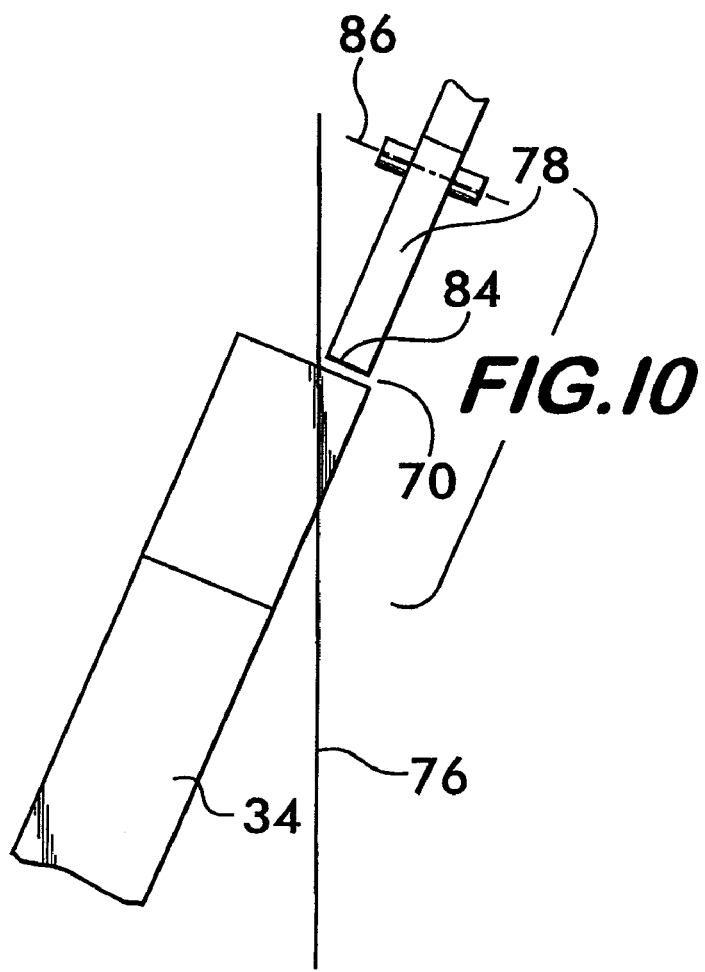
FIG. 10 is a side view taken at line 10-10 of FIG. 9.
Figure 9:
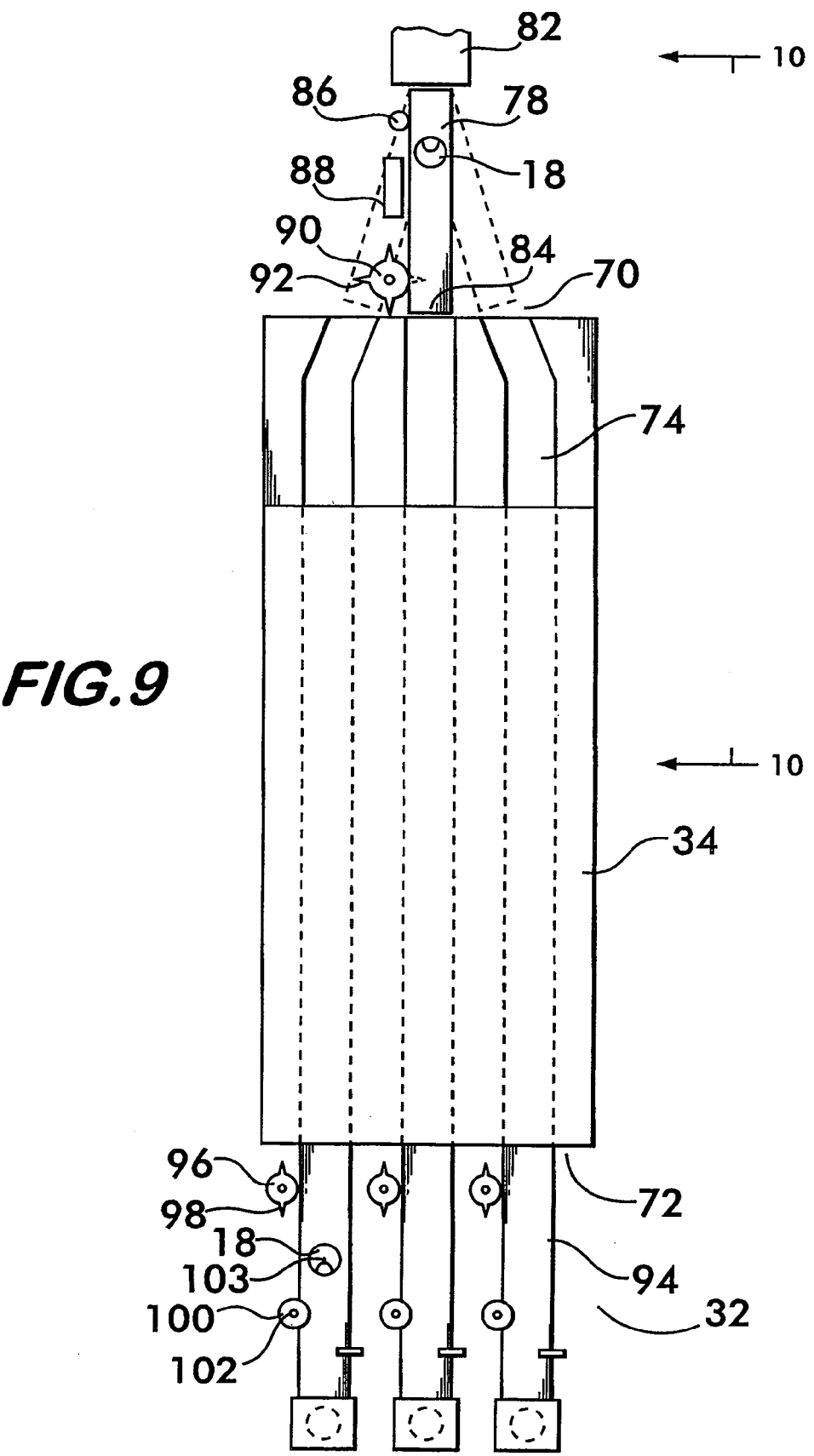
FIG. 9 is a partial sectional view taken at line 9-9 of FIG. 1.

Oven 34 is shown in detail in FIG. 9 and includes an entrance 70 for receiving the spouts 18, and an exit 72 for discharging the spouts to the assembly station 32. The oven has a plurality of guide chutes 74 through which the spouts pass. As shown in FIG. 10, the oven and its guide chutes are preferably oriented angularly with respect to a vertical axis 76, permitting the spouts to traverse the oven under the pull of gravity. In this example, the oven has three guide chutes, one for each container that is processed simultaneously. Preferably, the oven 34 is a forced air convection oven which heats the spouts to a temperature above the melting point of the adhesive but below the melting point of the spout material. Forced air convention heating is preferred because it provides even heating to all surfaces of the spouts.

The spouts are oriented using a sorting bowl (not shown) which arranges the spouts so that they all face in the same direction. From the sorting bowl, the oriented spouts are delivered pneumatically to a spout chute 78, best shown in FIG. 9. The spout chute 78 has an entrance 80 which receives the spouts from the sorting bowl pneumatic system 82 and an exit 84 which distributes the spouts to the guide chutes 74 of the oven 34. One spout chute 78 serves a plurality of guide chutes by pivoting about an axis 86 located near the entrance. The spout chute is pivoted by an actuator 88, for example, a pneumatic actuator, which moves the spout chute 78 to align its exit 84 with the various guide chutes 74 at the entrance 70 to oven 34. Preferably, the spout chute is also angularly oriented relative to vertical axis 76 so that the spouts feed by gravity.

The spouts delivered from the sorting bowl stack up in the spout chute 78 and are dispensed to the guide chutes 74 by a star wheel 90 mounted on the spout chute. Teeth 92 on the star wheel engage the spouts within the spout chute, and the spouts are released one at a time as the wheel rotates, for example, driven by a servomotor under the command of the controller. The spout chute 78 and its star wheel 90 are operated so as to supply spouts to the guide chutes as required. To that end, sensors (not shown) are located within each of the guide chutes which sense when the number of spouts within a particular chute is below a certain level. The sensor signals the controller that a guide chute requires spouts. The controller signals actuator 88, which pivots the spout chute 78 so that its exit aligns with the guide chute whose sensor signaled a low spout level. Once the spout chute is aligned with the proper guide chute, the controller rotates the star wheel 90 and dispenses spouts to the guide chute until the sensor in that chute indicates the desired level of spouts. This process is repeated, keeping each of the guide chutes full of spouts.

As shown in FIG. 9, heated spouts are discharged from the oven exit 72 into alignment chutes 94 comprising the assembly station 32. Preferably, the alignment chutes are vertically oriented and spouts pass through under gravity feed. In this example, apparatus there is one alignment chute for each oven guide chute. Discharge of the spouts from the oven is controlled by star wheels 96 at each alignment chute. The teeth 98 of the star wheels engage the spouts within the chutes. The star wheels are rotated incrementally at the command of the controller to release the spouts to alignment wheels 100 positioned beneath the star wheels 96. The alignment wheels extend partially into their respective chutes 94 and rotate continuously about a horizontal axis 102. When a spout encounters an alignment wheel, it is rotated within the chute about an axis 103 parallel to axis 102. The chute geometry below the alignment wheel is coordinated with the shape of the spouts such that the spout will drop past the alignment wheel and through the chute only when it is oriented properly with respect to the container into which it will be inserted. For example, it is desired to align the spout with the handle so that the container may be conveniently grasped by the handle to pour the container contents.

Figure 11:
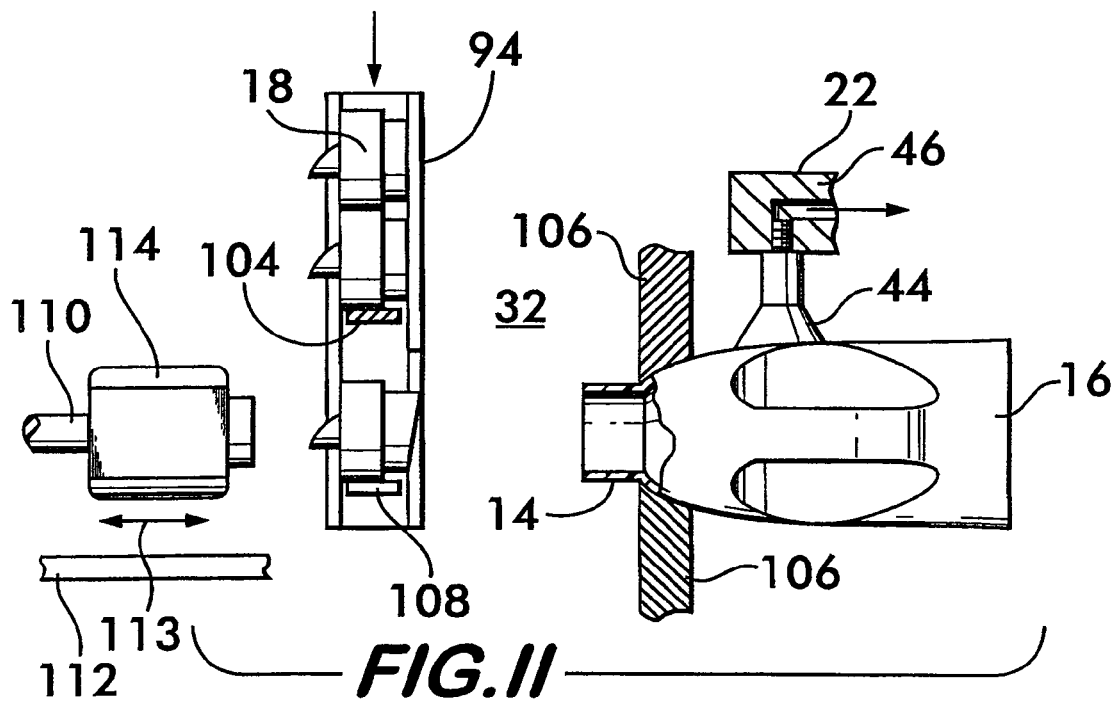
FIG. 11 is a partial sectional view taken at line 11-11 of FIG. 1.
Figure 12:
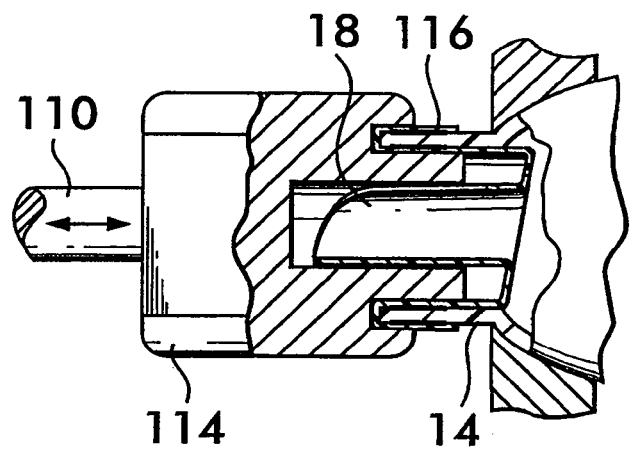
FIG. 12 is a partial sectional view showing a portion of FIG. 11 on an enlarged scale.

As shown in FIG. 11, after the spouts 18 are rotated by the alignment wheels to the desired orientation they drop through the alignment chutes 94 to movable stop blocks 104. The pick and place mechanism 22 rotates to position the containers 16 at the assembly station 32 (see also FIG. 1) and aligns each container with a respective alignment chute 94. Movable clamping jaws 106 engage each container from above and below, providing support for the assembly process. Movable stop blocks 104 are pivoted to allow spouts to drop onto a fixed stop blocks 108 that are positioned to align the spouts 18 with the containers 16. As shown in FIG. 1, three spout insertion arms 110 are mounted on a movable carriage 112. Carriage 112 may be mounted on rails for precise motion toward and away from the alignment chutes. The carriage may be actuated pneumatically, hydraulically mechanically or by other means known in the art. Each insertion arm is aligned with a respective spout 16 and a container neck 14 as best shown in FIG. 11. At the end of each arm 110 is a fitting 114 which is shaped to engage the spout. The carriage 112 moves along a horizontal axis 113 under the command of the controller, forcing the arms into engagement with the spouts 18, and pushing the spouts from the alignment chutes 94 into the necks of the containers 16 as shown in FIG. 12. The molten adhesive 116 on the spouts 18 secures the spouts to the necks 14.

The carriage then reverses to retract the arms from the container necks and the alignment chutes, allowing the next spouts 18 to drop onto the fixed stop blocks 108, and the next containers 16 to be moved into alignment with the alignment chutes 94 at the assembly station 32 upon further rotation of the pick and place mechanism 22. Rotation of the pick and place mechanism moves the completed containers 16 to the take-away conveyor 36 (see FIG. 1), where they are removed for further processing or packaging. The apparatus operates continuously in the manner described above under command of the controller 40, which coordinates the motions of the various components to ensure synchronized operation.

The apparatus according to the invention provides a device for the reliable manufacture of containers which is compact and efficient in its use of factory floor space and energy, allowing for significant production advantage.

What is claimed is:

1. An apparatus for removing a moil from a neck of a container and attaching a spout thereto; said apparatus comprising:
    a cutting station having a blade engageable with said neck for cutting said moil, one of said blade or said container being movable relatively to the other to effect said cutting;
    an assembly station having a movable arm engageable with said spout, said arm being movable to insert said spout into said neck;
    a pick and place device for holding said container, said pick and place device being movable to position said container in sequence at said cutting station and said assembly station; and
    an oven having an entrance for receiving said spout and an exit positioned to discharge said spout to said assembly station, said oven being positioned above one of said stations, said oven heating said spout before it is attached to said container neck.

2. An apparatus according to claim 1, further comprising a facing station having a finishing tool engageable with said neck for finishing a surface created upon cutting of said moil, one of said finishing tool and said container being movable relatively to the other to effect said finishing, said pick and place device being movable to position said container at said facing station.

3. An apparatus according to claim 1, wherein said pick and place device comprises an armature rotatable about an axis, said stations being arranged along an arcuate path about said armature, said armature moving said containers along said arcuate path between said stations.

4. An apparatus according to claim 1, wherein said oven comprises a guide chute positioned above said assembly station, said guide chute being oriented at an angle relatively to a vertical axis, said spouts moving through said guide chute under gravity.

5. An apparatus according to claim 4, wherein said oven comprises a convection oven circulating hot air over said spout.

6. An apparatus according to claim 1, wherein said arm is mounted on a carriage movable along a horizontal axis for inserting said spout into said neck.

7. An apparatus according to claim 1 further comprising:
an alignment chute positioned at said assembly station, said alignment chute being vertically oriented; and
an alignment wheel mounted adjacent to said alignment chute and engageable with said spout, said alignment wheel turning said spout about an axis so as to align said spout with said container, said alignment chute and said spout being dimensioned so that said spout drops through said alignment chute when said spout is oriented with said container, said arm pushing said spout from said alignment chute into said neck.

8. An apparatus according to claim 1, further comprising:
a first conveyor moving said container to said pick and place device; and
a second conveyor moving said container away from said assembly station.

9. An apparatus for removing moils from necks of a plurality of containers and attaching spouts to each of said necks, said apparatus comprising:
a cutting station positioned along an arcuate path and having a plurality of blades, each engageable with one of said necks for cutting said moils, said blades being movable relatively to said containers to effect said cutting;
a facing station positioned along said arcuate path and having a plurality of finishing tools, each engageable with a respective one of said necks for finishing a surface on each said neck created upon cutting of said moil therefrom, each of said finishing tools being rotatable relatively to said necks to effect said smoothing;
an assembly station positioned along said arcuate path and having a plurality of movable arms, each said arm being engageable with one of said spouts, said arms being movable to insert said spouts into said necks;
a pick and place device for holding said plurality of said containers, said pick and place device comprising a rotatable armature moving said containers along said arcuate path to position said containers in sequence at said cutting station, said facing station and said assembly station; and
an oven positioned above said assembly station and having an oven entrance for receiving said spouts and an oven exit positioned to discharge said spouts to said assembly station, said oven heating said spouts before they are attached to said container necks.

10. An apparatus according to claim 9, wherein said cutting station has three said blades for cutting three of said moils simultaneously.

11. An apparatus according to claim 10, wherein said facing station has three of said finishing tools for finishing three said surfaces on three of said necks simultaneously.

12. An apparatus according to claim 11, wherein said assembly station has three of said arms, said arms being mounted on a carriage movable along a horizontal axis for inserting three of said spouts into said necks simultaneously.

13. An apparatus according to claim 12, wherein said oven has three guide chutes, each said guide chute receiving said spouts at said oven entrance, and each said guide chute discharging three of said spouts simultaneously at said oven exit, said guide chutes being oriented at an angle relatively to a vertical axis, said spouts moving through said guide chutes under gravity.

14. An apparatus according to claim 13, wherein said assembly station comprises:
three alignment chutes aligned with said guide chutes for receiving said spouts discharged therefrom, said alignment chutes being vertically oriented;
three alignment wheels mounted adjacent to said alignment chutes and engageable with said spouts, said alignment wheels turning said spouts about an axis so as to align said spout with said container, said alignment chutes and said spouts being dimensioned so that said spouts drop through said alignment chutes when said spouts are oriented with respective ones of said containers, said arms pushing said spouts from said alignment chutes into said necks; and
three star wheels, each said star wheel positioned adjacent to one of said alignment chutes, rotation of each of said star wheels releasing a spout to said alignment wheels for alignment thereof with said containers.

15. An apparatus according to claim 9, further comprising:
a first conveyor moving said containers to said pick and place device; and
a second conveyor moving said containers away from said assembly station.

16. An apparatus according to claim 13, further comprising:
a spout chute positioned above said oven, said spout chute being angularly oriented with respect to said vertical axis, spouts moving through said spout chute under gravity, said spout chute having a chute entrance for receiving said spouts and a chute exit for discharging said spouts, said spout chute being rotatable so as to align said chute exit with each of said guide chutes one at a time; and
a star wheel being mounted on said spout chute, rotation of said star wheel permitting said spouts to be discharged from said chute exit into said guide chutes.

17. An apparatus according to claim 9, wherein said oven comprises a convection oven circulating hot air over said spouts.

18. A method of removing a moil from a neck of a container and attaching a spout thereto, said spout having hot melt adhesive thereon, said method comprising:
moving said container to a cutting station;
cutting said moil from said neck of said container at said cutting station;
moving said container to an assembly station;
heating said spout until said hot melt adhesive is molten by moving said spout through an oven using gravity;
aligning said spout with said neck; and
inserting said spout into said neck.

19. A method according to claim 18, further comprising:
moving said container to a facing station; and
finishing a surface on said neck created when said moil is cut therefrom.

20. A method according to claim 18, wherein said heating is effected by moving hot air through said oven.

21. A method according to claim 18, further comprising rotationally orienting said spout relatively to said container before inserting said spout into said neck.

22. A method according to claim 18, wherein said container is moved between said stations along an arcuate path.

* * * * *